United States Patent
Fotou

[19]

[11] Patent Number: 6,065,914
[45] Date of Patent: May 23, 2000

[54] APPARATUS FOR SECURING A VEHICLE

[76] Inventor: Dean H. Fotou, P.O. Box 371, Franklin Springs, Ga. 30639

[21] Appl. No.: 08/873,097

[22] Filed: Jun. 11, 1997

Related U.S. Application Data

[60] Provisional application No. 60/019,706, Jun. 13, 1996.

[51] Int. Cl.⁷ .................................................. B60P 7/08
[52] U.S. Cl. ................................ 410/3; 410/7; 410/12; 410/23; 410/96; 410/100
[58] Field of Search ................................ 410/3, 7, 9, 10, 410/11, 12, 23, 96, 97, 100; 248/499, 503, 505, 509, 565, 578; 224/420, 568, 569, 571, 924, 42.39, 42.4; 24/68 CD, 298, 302, 265 CD

[56] References Cited

U.S. PATENT DOCUMENTS

| | | | |
|---|---|---|---|
| Re. 19,337 | 10/1934 | Butterworth | 410/12 X |
| 1,158,247 | 10/1915 | Lindblom | 248/509 X |
| 1,392,757 | 10/1921 | Gales | 18/68.5 |
| 1,528,712 | 3/1925 | Ward | 24/298 X |
| 1,816,897 | 8/1931 | Fedderman et al. | 410/9 |
| 2,638,318 | 5/1953 | Nampa | 410/46 |
| 2,847,207 | 8/1958 | Chulack et al. | 410/23 X |
| 3,231,950 | 2/1966 | Lummis | 24/300 X |
| 3,957,285 | 5/1976 | Schlaeger | 410/100 |
| 4,078,821 | 3/1978 | Kitterman | 410/3 X |
| 4,257,570 | 3/1981 | Rasmussen | 248/503 X |
| 4,314,783 | 2/1982 | Parnell et al. | 410/100 X |
| 4,441,736 | 4/1984 | Shedden | 410/3 X |
| 4,671,713 | 6/1987 | Lenkman | 410/7 |
| 4,730,964 | 3/1988 | Joyner | 410/23 |
| 4,842,458 | 6/1989 | Carpenter | 410/3 |
| 5,092,504 | 3/1992 | Hannes et al. | 410/3 X |
| 5,326,202 | 7/1994 | Stubbs | 410/3 |
| 5,529,448 | 6/1996 | Kosma | 410/97 |
| 5,746,554 | 5/1998 | Boydston, IV et al. | 410/12 |
| 5,762,455 | 6/1998 | Long | 410/100 |

FOREIGN PATENT DOCUMENTS

| | | | |
|---|---|---|---|
| 163613 | 7/1953 | Australia | 410/3 |
| 94/11220 | 5/1994 | WIPO | 410/100 |

*Primary Examiner*—Stephen T. Gordon
*Attorney, Agent, or Firm*—Dority & Manning, P.A.

[57] ABSTRACT

An apparatus for securing a vehicle includes an elongated body, at least two attachment devices in communication with the body at opposite ends thereof, a tensioning device in communication with the body and configured to constantly apply a tightening force between at least two attachment devices, and an adjustment device in communication with the body for selectively applying a tightening force between two attachment devices.

7 Claims, 3 Drawing Sheets

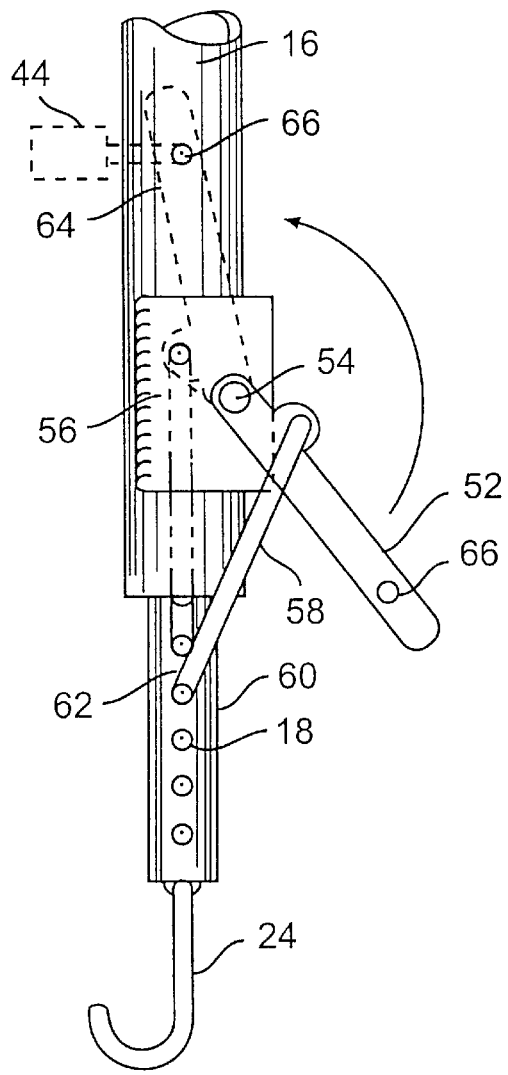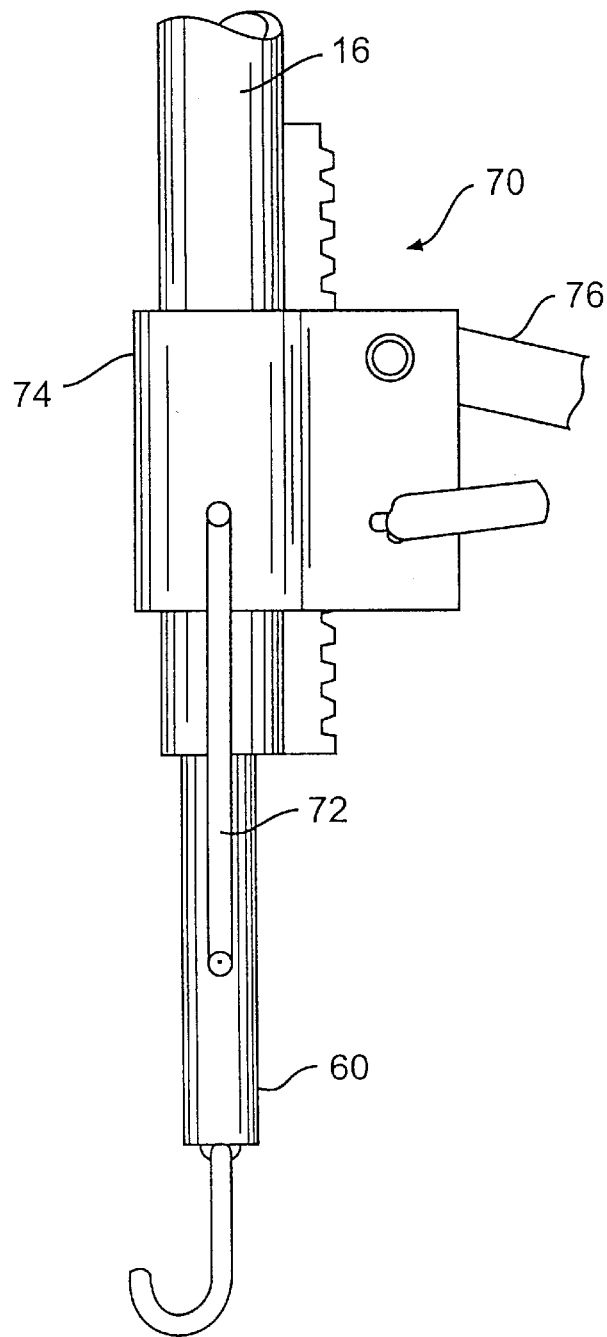
FIG. 5
FIG. 6

APPARATUS FOR SECURING A VEHICLE

The present application is based on a Provisional Application filed on Jun. 13, 1996 and having U.S. Ser. No. 60/019,706.

BACKGROUND OF THE INVENTION

The present invention relates to devices for securing a vehicle during transport. In particular, for example, the invention relates to improvements to vehicle tie-down devices.

Variable load cargo such as motorcycles are frequently difficult to adequately secure for transport overland, for example on a truck or a trailer. For example, shock absorbers on motorcycles tend to cause the motorcycle chassis to bounce as the trailer is pulled over the road. Additionally, since motorcycles balance on two wheels, they tend to lean to one side or the other, particularly as the trailer is pulled around a curve.

In general, prior art restraint devices for motorcycles extend from the trailer to each motorcycle handlebar. Typically, they include an adjustable strap, for example made of nylon, for each handlebar. Each strap connects at one end to the trailer and at the other end to a respective handlebar. An adjustment mechanism permits the strap to be shortened or lengthened to accommodate motorcycles of different sizes.

Unfortunately, such straps are often affected by weather conditions. For example, rain may cause nylon straps to stretch, whereas sunlight may cause them to contract. Consequently, if a trailer hauling a motorcycle is pulled through a rain storm, such straps may stretch so that the straps slip from the handlebars or so that the motorcycle wheels slip from their restrictive track, thereby causing the motorcycle to fall. On the other hand, exposure to sunlight may contract the straps, particularly if the straps are initially wet. This increases the load on the straps and on the handlebars, potentially causing strap breakage or motorcycle damage. Moreover, the tendency of the motorcycle to bounce and lean places a relatively extreme varying load on the straps, making proper initial adjustment of the straps difficult. Thus, motorcycle transport using such devices often entails frequent strap readjustment, particularly when traveling over rough roads or through changing weather conditions. Additionally, the straps on such devices are easily cut or released, making motorcycles secured in this manner subject to theft.

SUMMARY OF THE INVENTION

The present invention recognizes and address the foregoing disadvantages, and others, of prior art constructions and methods.

Accordingly, it is an object of the present invention to provide an improved device for securing a variable load cargo.

It is another object of the present invention to provide an improved device for securing a motorcycle on a trailer.

It is a still further object of the present invention to provide a cargo securing device which reduces risk of theft.

Some of these objects are achieved by an apparatus for securing a vehicle, the apparatus comprising a body and at least two attachment devices in communication with the body. A tensioning device is in communication with the body and is configured to constantly apply a tightening force between at least two of the attachment devices. An adjustment device is in communication with the body for selectively supplying a tightening force between two of the attachment devices.

The accompanying drawings, which are incorporated and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which;

FIG. 5 is a partial side view of an apparatus for securing a vehicle constructed in accordance with the present invention; and FIG. 6 is a partial side view of an apparatus for securing a vehicle constructed in accordance with the present invention.

Figure 1:
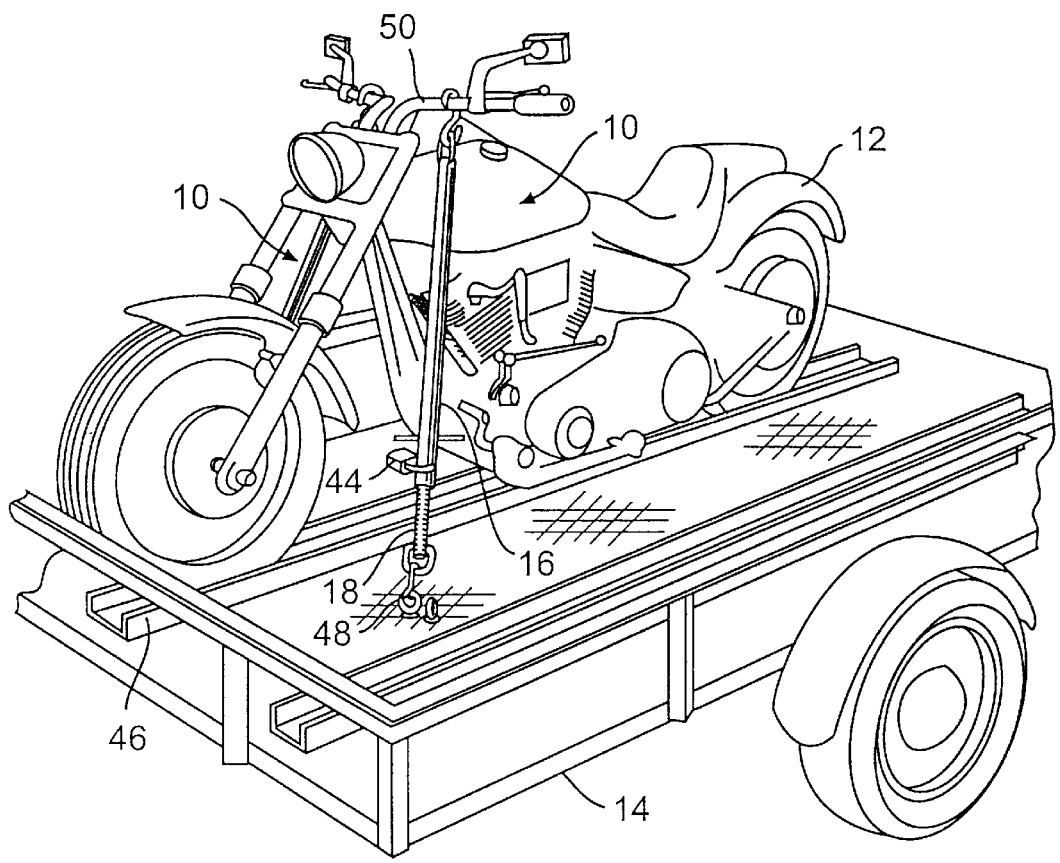
FIG. 1 is a perspective view of an embodiment of an apparatus for securing a vehicle constructed in accordance with the present invention.

Repeat use of reference characters in the present specification and drawings is intended to represent the same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

The present invention is concerned with an apparatus for securing a variable load cargo. Such cargo may include, for example, motorcycles, which tend to bounce and lean during transport on a trailer. Cargo may also include aircraft stored at an area exposed to wind, causing strain on restraint devices due to wing lift. Accordingly, FIG. 1 depicts a presently preferred embodiment of a tie down assembly, shown generally at 10, at least partially securing motorcycle 12 to trailer 14. In operation, tie down assembly 10 is attached to motorcycle 12 and trailer 14 and adjusted to apply a sufficient force tending to secure motorcycle 12 to trailer 14. Tie down assembly 10 also includes a tensioning device configured to constantly apply a force between motorcycle 12 and trailer 14 and to accommodate variations in load on tie down assembly 10. Such arrangement accommodates, for example, movement of the motorcycle during transport due to its shock absorbers.

Figure 2:
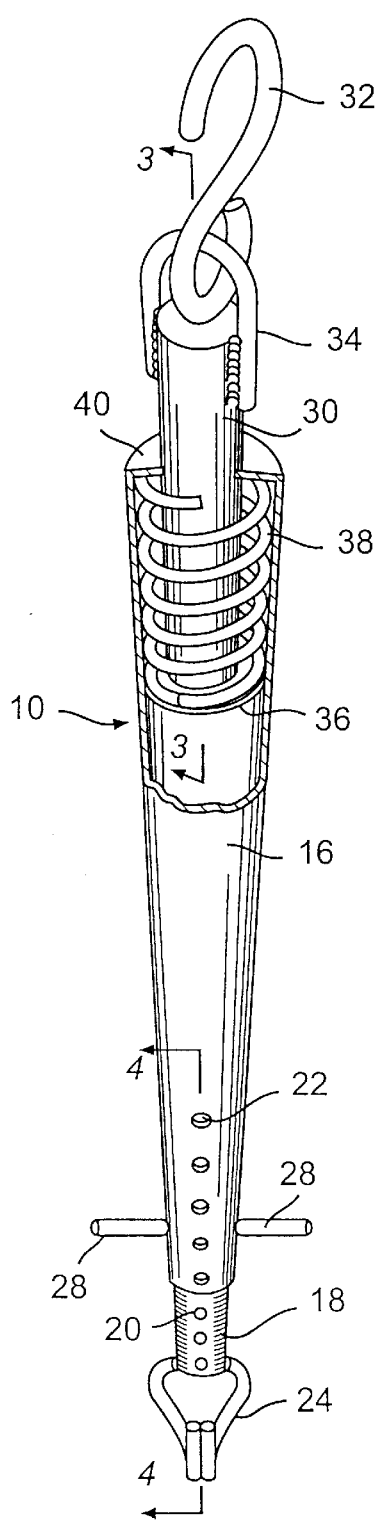
FIG. 2 is a partial cut-away perspective view of an apparatus as in FIG. 1.
Figure 3:
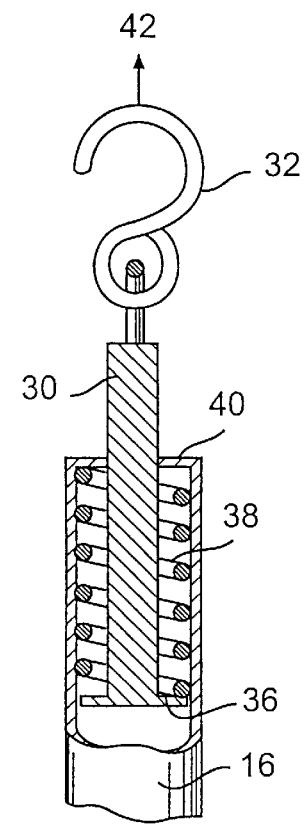
FIG. 3 is a partial cross-sectional view of the apparatus as in FIG. 2 taken along the lines 3—3.
Figure 4:
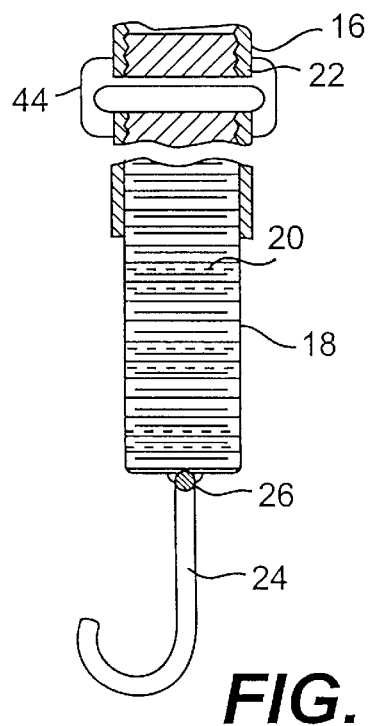
FIG. 4 is a partial cross-sectional view of the apparatus as in FIG. 2 taken along the lines 4—4.

Referring now to FIGS. 2, 3, and 4, tie down assembly 10 includes an elongated outer body 16. Lead screw 18 is threadably received by body 16 and includes holes 20 which selectively correspond to holes 22 in body 16. First hook 24 is welded to lead screw 18 at 26. Grip members 28 extend radially from body 16.

Rod 30 is slidably received by body 16 at the end of body 16 opposite lead screw 18. Second hook 32 is attached at one end of rod 30 by loop 34 welded to rod 30. Hook 32 may also be welded to the rod so that the hook is in a fixed position with respect to the rod. To protect the handlebar, the hook may be covered in a protective coating such as vinyl. Flange 36 extends from rod 30 at its end opposite loop 34. Coil 38 is positioned between flange 36 and end face 40 of body 16 such that a force is exerted against flange 36 and front face 40 opposing an outward axial force on second hook 32 indicated at 42.

Holes 20 extend through lead screw 18. When a hole 20 coincides with a pair of holes 22 through body 16, the arm of a lock 44 may pass therethrough. This prevents rotation of lead screw 18 and inhibits removal of tie down assembly 10.

Referring again to FIG. 1, after motorcycle 12 is loaded onto trailer 14 in track 46, tie down assembly 10 may be attached at one end to trailer 14 at anchor 48 and at its opposite end to motorcycle 12 at handlebar 50. Body 16 rotates about rod 30 and may be selectively rotated so as to move body 18 downward onto lead screw 18, causing handlebar 50 to exert a force 42 against second hook 32. Force 42 causes coil 38 to exert a tightening force between first hook 24 and second hook 32. The force exerted by coil 38 will vary responsively to variations in force 42. Thus, while the force exerted by tie down assembly 10 on handlebar 50 is not constant, a force is constantly applied if a sufficient tightening force was applied through the adjustment of body 16 relative to lead screw 18.

When tie down assembly 10 is sufficiently tightened, body 16 may be further adjusted to align a hole 20 with two holes 22. Lock 44 may then be placed on tie down 10 to prevent further rotation of body 16 with respect to lead screw 18.

It should be understood that various constructions of tie down assembly 10 are encompassed by the scope and spirit of the present invention. For example, the components of tie down assembly 10 may be constructed from various materials, including metals such as steel, or plastics. Furthermore, various equivalent attachment devices may be employed, for example S-hooks, clips, etc. Such attachment devices may be attached to tie down device 10 in a variety of ways and may be pivotally or rotatably joined thereto. Additionally, the present invention encompasses various equivalent tensioning devices, such as hydraulic springs and other compression devices.

Accordingly, FIGS. 5 and 6 depict other presently preferred embodiments of the invention employing alternative adjustment devices. Referring to FIG. 5, the adjustment device includes a lever arm 52 pivotally joined at 54 to side plate 56 secured to body 16. Arm 58 is attached to lever 52 at one end and selectively attached at its other end to lower rod 60 at 62. Lower rod 60 defines holes 18 therethrough. Arm 58 may be attached at any hole 18, depending upon, for example, the desired length of tie down assembly 10.

Once the attachment devices of tie down assembly 10 are appropriately placed, arm 58 may be secured to an appropriate hole 18 so that an appropriate tightening force may be applied between the attachment devices. As should be understood by those of ordinary skill in the art, a tightening force is applied when arm 52 is moved to a closed position as indicated in phantom at 64. Lower rod 60 is slidably received into body 16. Thus, upon closure of the adjustment device, lower rod 60 is pulled upward into body 16, thereby applying a force between hook 24 and hook 32. In the closed position, arm 58 is substantially axially aligned with lower rod 60 and body 16 and resists moving to an open position over and around pivotal joint 54. To provide additional security, lock 44 may be secured through hole 66 in arm 52 and a pair of opposing holes in body 16.

Alternatively, for example, a similar tightening mechanism may be attached at the upper end of the tie-down assembly. More specifically, a side plate 56 may be attached at the upper end of body 16 proximate rod 30. An arm 58 may attach at one end to lever 52 similarly to the arrangement illustrated in FIG. 5 and at its other end to rod 30. In this arrangement, movement of the lever 52 downward closes the mechanism.

A locking arrangement similar to that shown in FIG. 5 may also be used in this arrangement. Alternatively, however, the ram 52 may be formed as a u-shaped cup that receives body 16 when the tightening mechanism is closed so that opposing edges of the cup portion extend beyond body 16. Holes may be provided through these edges to receive the arm of a lock such as lock 44 in FIG. 5. Additionally, a single grip member 28, rather than the two grip members 28 illustrated in FIG. 2, may extend outward from body 16 to be received by a vertical slot in the cup portion of arm 52 as arm 52 is closed. The single grip member, in cooperation with the vertical slot, allows rod 30 and body 16 to move axially, but not rotationally, with respect to each other. Holes 20 and 22 (FIG. 2) may be eliminated.

Referring now to FIG. 6, another presently preferred adjustment device includes a ratchet device 70 attached to lower rod 60 by arms 72 on either side of tie down assembly 10. As should be understood by those of ordinary skill in the art, outer sleeve 74 may move upward along body 16 upon the operation of ratchet 70 through arm 76 exerting force between hook 24 and hook 32.

While various preferred embodiments of the invention have been described above, it is to be understood that any and all equivalent realizations of the present invention are included within the scope and spirit thereof. For example, various equivalent tensioning devices may be employed in communication with, or incorporated within, a rigid or flexible body to constantly apply a tightening force between the attachment devices. Such devices may include, for example, coils, hydraulic compression devices, or various mechanical apparatus in communication with or within the body or with the body and associated moving parts. Similarly, various equivalent adjustment devices may be employed to selectively apply force between at least two attachment devices. Furthermore, the body and attachment devices may include various equivalent forms. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the invention.

What is claimed is:

1. Apparatus for securing a vehicle to a trailer, the apparatus comprising:
    a first elongated rigid body having a first end and a second end opposite said first end;
    a second elongated rigid body having a first end and a second end opposite said second body first end, wherein said second body is disposed parallel to, and slidably with respect to, said first body so that said first body first end and said second body second end overlap each other;

a first attachment device connected to said second body first end, wherein said first attachment device is configured to secure said second body to one of said trailer and said vehicle;

a spring having one end bearing on said first body first end and an opposite end bearing on said second body second end so that said spring biases said first body and said second body toward each other;

a third elongated rigid body proximate said first body second end, wherein said third body is disposed parallel to, and is axially reciprocal with respect to, said first body; and a second attachment device connected to said third body and configured to secure said third body to the other of said trailer and said vehicle, wherein one of said first body and said third body is threadedly engaged to the other of said first body and said third body so that actuation of said threaded engagement in a tightening direction applies an axial force drawing said first body and said third body axially together against an opposing axial force applied to said first attachment device by said one of said trailer and said vehicle, thereby compressing said spring.

2. The apparatus as in claim 1, wherein one of said third body and said first body is axially aligned with and received within the other of said third body and said first body.

3. The apparatus as in claim 2, wherein said first body defines a plurality of holes extending transversely through said first body proximate said first body second end, wherein said third body includes at least one hole extending transversely through said third body, and wherein said apparatus includes a pin extending through one of said first body holes and one of said third body holes that is aligned therewith.

4. The apparatus as in claim 1, wherein said first body is comprised of a hollow steel rod.

5. The apparatus as in claim 1, wherein each of said first attachment device and said second attachment device comprises a hook.

6. The apparatus as in claim 1, including a cam-over device attached to said first attachment device and one of said first body and said second body, said cam-over device being configured to pull said one of said first body and said second body toward said first attachment device against said opposing axial force in moving said cam-over device to a closed position.

7. The apparatus as in claim 1, including a cam-over device attached to said first body and said second body, said cam-over device being configured to pull said first body and said second body toward each other in moving to a closed position, wherein said cam-over device includes an elongated lever arm having a base end pivotally connected to said first body and a free end opposite said base end, and a rigid elongated secondary arm having a first end connected to said second body and a second end, opposite said first end, connected to said lever arm between said base end and said free end.

* * * * *